D. W. DAKE.
Butter-Workers.
No. 134,788.                    Patented Jan. 14, 1873.
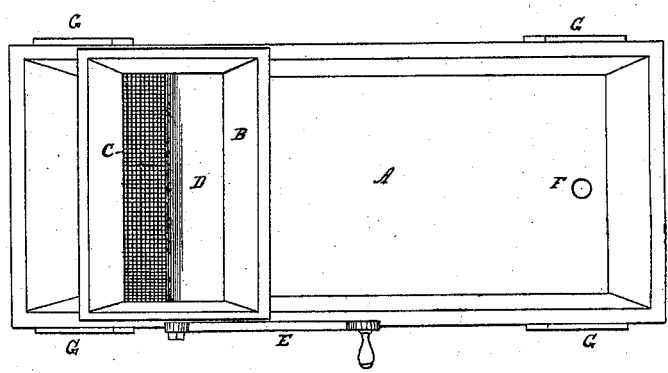
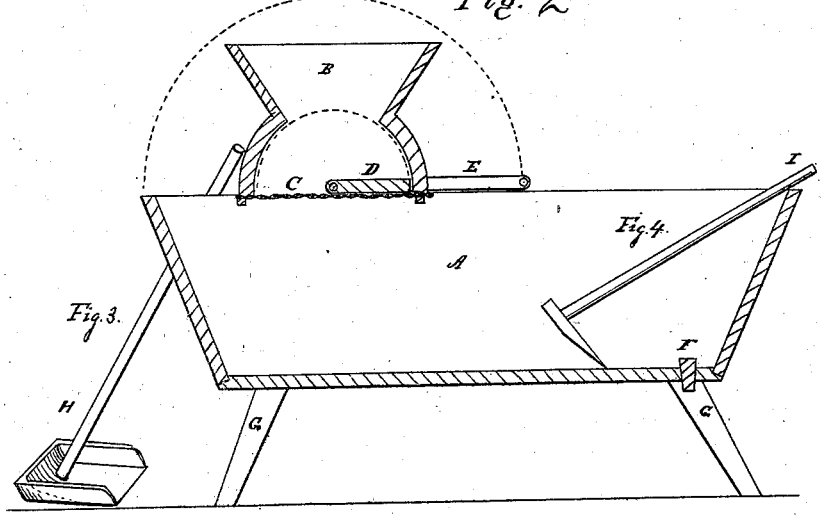
Witnesses,
F. H. Brown.
S. M. Millard.
Inventor,
Daniel W. Dake.
By Gridley & Warner.
Attys

UNITED STATES PATENT OFFICE.

DANIEL W. DAKE, OF CHICAGO, ILLINOIS.

IMPROVEMENT IN BUTTER-WORKERS.

Specification forming part of Letters Patent No. 134,788, dated January 14, 1873.

*To all whom it may concern:*

Be it known that I, DANIEL W. DAKE, of Chicago, in the county of Cook and State of Illinois, have invented certain new and useful Improvements in Butter-Workers; of which the following is a full, clear, and exact description, which will enable others skilled in the art to which my invention appertains to make and use the same, reference being had to the accompanyng drawing forming a part hereof, and in which—

Figure 1 represents a top view of my improved worker; Fig. 2, a longitudinal central vertical section of the same; Fig. 3 represents the scoop or lifter; and Fig. 4, the hoe or worker.

Like letters of reference indicate like parts.

My invention relates to that class of devices which are designed for working and reworking butter. The producer generally prepares his butter and ships it in comparatively small quantities. It is seldom that different churnings will produce butter in all respects alike; hence either the producer, or the trader or middleman to whom the butter is shipped, is obliged to work or rework the different churnings together in order to produce a comparatively large quantity of butter having a uniform color, hardness, and flavor. As the middleman, or he who directly supplies the market, generally receives his supply from a number of producers, the process of reworking the butter for the purpose of producing a large quantity of a uniform grade is most extensively and advantageously carried on by the former.

The object of my invention is to facilitate the operation of working and reworking butter either in large or small quantities; and to that end it consists in the means employed for that purpose and hereafter fully set forth.

In the drawing, A represents the vat for the reception of the butter after it is forced through the sieve. B is a hopper for the reception of the butter to be worked or reworked. This hopper is attached to the vat in any suitable manner, and arranged substantially as shown. C is a sieve across, and entirely inclosing, the bottom of the hopper. D is a presser, from which shoulders or spindles extend which have bearings in the hopper. E is a crank rigidly attached to one of the presser shoulders or spindles. F is a plug, by removing which the liquids are drained from the vat. G G are legs for the purpose of supporting the vat at any suitable height.

In order to pass the butter through the sieve the butter is first placed in the hopper; the crank E is then turned so that the presser will force the butter through the sieve and into the vat or other suitable receptacle. By this means the butter is thoroughly shredded, and as the shreds fall into the vat they mingle with each other, thus facilitating the process of working and reworking.

I deem it preferable to make the base of the hopper so that when pressure is applied to the crank the butter can escape through the sieve only, and such a construction is shown in Figs. 1 and 2.

After the butter is shredded it is worked or mixed in the vat until in a proper condition for packing.

H is a scoop or shovel, by means of which I carry the butter to the hopper; it may also be employed for carrying the butter from the vat. The handle of this scoop is so attached to the scoop that when the handle is in a vertical position the cutting-edge of the scoop will be slightly tipped up, so that the butter cannot readily fall off. The bottom of the scoop is also slightly rounded. This scoop may also be used for the purpose of drawing the butter from beneath the hopper and for working or mixing the butter in the vat. I is a hoe or ladle, especially constructed for the purpose of drawing the butter from beneath the hopper, and for the purpose of working and mixing the butter in the vat; the handle of this hoe or ladle is inclined in the manner shown, so that it can be conveniently used for the purpose mentioned, and the bottom of the ladle is chamfered off toward its cutting-edge.

Having thus described my invention, what I claim as new, and desire to secure by Letters Patent, is—

1. In combination, the hopper B, sieve C, presser D, crank E, and vat A, substantially as specified.

2. The implement I, constructed in the manner described, and for the purposes set forth.

3. The implement H, constructed in the manner described, and for the purposes set forth.

The foregoing specification signed by me the 1st day of June, 1872.

DANIEL W. DAKE.

Witnesses:
F. H. BROWN,
F. F. WARNER.